United States Patent [19]

Debroy et al.

[11] Patent Number: 4,994,507

[45] Date of Patent: Feb. 19, 1991

[54] CATHODIC ELECTRODEPOSITION COATINGS CONTAINING LEAD CYANAMIDE AS A SUPPLEMENTARY CATALYST

[75] Inventors: Tapan K. Debroy, Utica; Ding Y. Chung, Rochester Hills; Craig R. Deschner, Southfield; Sioe-Heng A. Tjoe, Troy, all of Mich.

[73] Assignee: E. I. Du Pont de Nemours and Company, Wilmington, Del.

[21] Appl. No.: 481,542

[22] Filed: Feb. 20, 1990

[51] Int. Cl.$^5$ .................... C08L 31/00; C25D 13/00; B01J 31/00

[52] U.S. Cl. .................. 523/415; 204/181.7; 502/152

[58] Field of Search .............. 204/181.7; 523/415; 502/152

[56] References Cited

U.S. PATENT DOCUMENTS

| | | | |
|---|---|---|---|
| 4,115,226 | 9/1978 | Zwack et al. | 204/181 C |
| 4,246,151 | 1/1981 | Doby et al. | 260/29.2 TN |
| 4,277,427 | 7/1981 | Kaminski et al. | 427/373 |
| 4,332,711 | 4/1982 | Kooymans et al. | 523/402 |
| 4,352,842 | 10/1982 | Kooymans et al. | 427/385.5 |
| 4,397,990 | 8/1983 | Kooymans et al. | 525/167 |
| 4,401,774 | 8/1983 | Kooymans et al. | 523/402 |
| 4,435,559 | 3/1984 | Valko | 528/45 |
| 4,443,569 | 4/1984 | Schroder et al. | 523/414 |
| 4,888,244 | 12/1989 | Masubuchi et al. | 204/181.7 |

*Primary Examiner*—John F. Niebling
*Assistant Examiner*—K. Mayekar
*Attorney, Agent, or Firm*—John M. Lynn; Hilmar L. Fricke

[57] ABSTRACT

Disclosed herein are cathodic electrodepositable coating baths containing lead cyanamide as a supplementary catalyst. It has been found that using lead cyanamide in conjunction with a primary metal catalyst (e.g. dibutyltin oxide) results in an electrocoat system with superior underbake cure without sacrificing chipping characteristics during overbake cure.

12 Claims, No Drawings

4,994,507

CATHODIC ELECTRODEPOSITION COATINGS CONTAINING LEAD CYANAMIDE AS A SUPPLEMENTARY CATALYST

TECHNICAL FIELD

The field of art to which this invention pertains is cathodic electrodepositable coating baths containing lead cyanamide as a supplementary catalyst. It has been found that using lead cyanamide as a supplementary catalyst in conjunction with a primary metal catalyst (e.g. metal catalysts such as dibutyltin oxide) results in an electrocoat system with superior underbake cure without sacrificing chipping characteristics during overbake cure. In other words, the use of lead cyanamide with dibutyltin oxide broadens the useful curing temperature range.

BACKGROUND ART

The coating of electrically conductive substrates by electrodeposition is a well known and important industrial process. (For instance, electrodeposition is widely used in the automotive industry to apply primers to automotive substrates). In this process, a conductive article is immersed as one electrode in a coating composition made from an aqueous emulsion of film-forming polymer. An electric current is passed between the article and a counter-electrode in electrical contact with the aqueous emulsion, until a desired coating is produced on the article. The article to be coated is the cathode in the electrical circuit with the counter-electrode being the anode.

Resin compositions used in cathodic electrodeposition baths are also well known in the art. These resins are typically manufactured from polyepoxide resins which have been chain extended and adducted to include a nitrogen The nitrogen is typically introduced through reaction with an amine compound. Typically these resins are blended with a crosslinking agent and then salted with an acid to form a water emulsion which is usually referred to as a principal emulsion.

The principal emulsion is combined with a pigment paste, coalescent solvents, water, and other additives at the coating site to form the electrodeposition bath. The electrodeposition bath is placed in an insulated tank containing the anode. The article to be coated is made the cathode and is passed through the tank containing the electrodeposition bath. The thickness of the coating is a function of the bath characteristics, the electrical operating characteristics, the immersion time, and so forth.

The coated object is removed from the bath after a set amount of time. The object is rinsed with deionized water and the coating is cured typically in an oven at sufficient temperature to produce crosslinking.

The prior art of cathodic electrodepositable resin compositions, coating baths, and cathodic electrodeposition processes are disclosed in U.S. Pat. Nos. 3,922,253; 4,419,467; 4,137,140; and 4,468,307.

Some important characteristics of the electrocoat primer to the automotive industry are chip resistance and intercoat adhesion of the electrocoat primer. Chip resistance is important to the automotive industry because automotive coatings are inherently subject to chipping from pebbles, debris and so forth. Chip resistant primers can help defray warranty costs associated with the coating. It is more difficult to obtain satisfactory chip resistance in an underbake condition. (Underbake is the lower limit of the cure range for a given system. Underbake for a typical current commercial cathodic electrocoat system is about 20° F. to 30° F. below the standard bake temperature for a given time.) In the automotive industry underbake is especially prevalent on the front grill section of the car because of the thicker and heavier metal. Often the front grill metal never reaches standard bake temperature and thus is underbaked. Unfortunately, this is the area of the car which most needs chip protection because of its location.

It is well known in the art that adding additional amounts of cure catalyst will help the cure at underbake conditions and give better chip resistance. The trade off however, is that the excess cure catalyst often causes overcure (brittleness) at standard or overbake conditions because of higher crosslinking density. (Overbake is the upper limit of the cure range for a given system. Overbake for a typical current commercial cathodic electrocoat system is about 20° F. to 30° F. higher than standard bake temperature for a given time.)

Intercoat adhesion likewise is important because the electrocoat primer is typically covered with a topcoat. If the topcoat is damaged, good intercoat adhesion will prevent the flaw from expanding.

What is needed is a cathodic electrocoat primer which gives improved chip resistance at underbake without sacrificing standard or overbake chip resistance and also gives improved intercoat adhesion.

SUMMARY OF THE INVENTION

It has been discovered that by adding lead cyanamide as an adjunct to the primary catalyst of the electrocoat results in an electrocoat film which has surprisingly superior qualities in the areas of chip resistance and intercoat adhesion. More specifically the use of lead cyanamide with a primary catalyst gives improved chip resistance at underbake without sacrificing standard or overbake chip resistance.

DETAILED DESCRIPTION OF THE INVENTION

As previously mentioned, it is well known that most principal emulsions in electrodeposition baths comprise an epoxy amine adduct blended with a cross-linking agent and salted with an acid in order to get a water soluble product. The supplemental lead cyanamide catalyst is potentially usable with a variety of different cathodic electrocoat binder resins, but the preferred binder resin is the typical epoxy-amine adduct of the prior art. These resins are generally disclosed in U.S. Pat. No. 4,419,467 which is incorporated herein by reference.

Likewise the preferred crosslinkers for the above mentioned binder resins are also well known in the prior art. They are aliphatic and aromatic isocyanates such as hexamethylene diisocyanate, toluene diisocyanate, methylene diphenyl diisocyanate and so forth. These isocyanates are pre-reacted with a blocking agent such as oximes, alcohols, and caprolactams which block the isocyanate functionality i.e. the crosslinking functionality). Upon heating the blocking agents separate and crosslinking occurs. Isocyanate crosslinkers and various blocking agents are well known in the prior art. These crosslinking agents and blocking agents are also disclosed in U.S. Pat. No. 4,419,467.

Curing catalysts such as tin catalysts are necessarily present in the composition and are also well known in the prior art. Examples are dibutyltin oxide (DBTO) and dibutyltin dilaurate. When used, they are typically present in amounts of about 0.05 to 1 percent by weight based on weight of total resin solids. As discussed above it is well known in the art that standard amounts of tin catalyst can cause a problem with underbake curing and therefore chip resistance. On the other hand, adding additional amounts of tin catalyst will help the cure at underbake conditions and give better chip resistance but the trade off is that the excess tin catalyst often causes overcure (brittleness) at standard bake or overbake conditions because of higher crosslinking density. Excess amounts of tin catalyst may also cause top coat delamination (especially when there is no primer surfacer over the electrocoat and the topcoat film thickness is not adequate).

Surprisingly, it has been discovered that by adding lead cyanamide as an adjunct to the primary metal catalyst (e.g. tin, lead, zinc, cobalt, mercury, and so forth) of the electrocoat composition gives improved cure (chip resistance) at underbake without sacrificing standard or overbake chip resistance. As discussed above tin catalysts are the most common primary metal catalysts and these were the catalysts used in our invention. Nevertheless it is possible that other metal catalysts could be used as the primary metal catalyst. A major advantage of using lead cyanamide as the supplemental catalyst is that lead cyanamide is easy to disperse. In fact it is even easier to disperse than dibutyltin oxide. Furthermore lead cyanamide stays uniformly distributed in the electrocoat bath. And loss of lead cyanamide to the ultrafiltration process is minimal.

Typically the weight ratio of dibutyltin oxide to lead cyanamide is a range of about 1.0:2.0 to 4.0:1.0 and preferably 1.0:1.0 to 3.0:1.0. Our most preferred ratio of dibutyltin oxide to lead cyanamide is about 3.0:2.0. (Conceivably lead cyanamide could be used as a cathodic electrocoat catalyst by itself).

The cationic resin and the blocked isocyanate are the principal resinous ingredients in the electrocoating composition and are usually present in amounts of about 30 to 50 percent by weight of solids.

Besides the resinous ingredients described above, the electrocoating compositions usually contain a pigment which is incorporated into the composition in the form of a paste. The pigment paste is prepared by grinding or dispersing a pigment into a grinding vehicle and optional ingredients such as wetting agents, surfactants, and defoamers. Pigment grinding vehicles are well known in the art. After grinding, the particle size of the pigment should be as small as practical, generally, a Hegman grinding gauge of about 6 to 8 is usually employed.

Pigments which can be employed in the practice of the invention include titanium dioxide, basic lead silicate, strontium chromate, carbon black, iron oxide, clay and so forth. Pigments with high surface areas and oil absorbencies should be used judiciously because they can have an undesirable effect on coalescence and flow.

The lead cyanamide is usually added to the pigment paste prior to grinding. The lead cyanamide must be dispersed to a proper particle size to be effective. This particle size is about 6 microns to 12 microns. It is also possible to grind the lead cyanamide separately and add it to the paste or to the electrocoat bath directly.

Lead cyanamide is commercially available from BASF Corporation under the trade name LY-80®. The commercially available lead cyanamide must be ground as described above to be usable as a cathodic electrocoat supplementary catalyst.

The pigment-to-resin weight ratio is also fairly important and should be preferably less than 0.5:1, more preferably less than 0.4:1, and usually about 0.2 to 0.4:1. Higher pigment-to-resin solids weight ratios have also been found to adversely affect coalescence and flow.

The coating compositions of the invention can contain optional ingredients such as wetting agents, surfactants, defoamers and so forth. Examples of surfactants and wetting agents include alkyl imidazolines such as those available from Ciba-Geigy Industrial Chemicals as "Amine C", acetylenic alcohols available from Air Products and Chemicals as "Surfynol 104". These optional ingredients, when present, constitute from about 0 to 20 percent by weight of resin solids. Plasticizers are optional ingredients because they promote flow. Examples are high boiling water immiscible materials such as ethylene or propylene oxide adducts of nonyl phenols or bisphenol A. Plasticers are usually used at levels of about 0 to 15 percent by weight resin solids.

The electrodepositable coating compositions of the present invention are dispersed in aqueous medium. The term "dispersion" as used within the context of the present invention is believed to be a two-phase translucent or opaque aqueous resinous system in which the resin is in the dispersed phase and water the continuous phase. The average particle size diameter of the resinous phase is about 0.1 to 10 microns, preferably less than 5 microns. The concentration of the resinous products in the aqueous medium is, in general, not critical, but ordinarily the major portion of the aqueous dispersion is water. The aqueous dispersion usually contains from about 3 to 50 percent preferably 5 to 40 percent by weight resin solids. Aqueous resin concentrates which are to be further diluted with water, generally range from 10 to 30 percent by total weight solids.

Besides water, the aqueous medium may also contain a coalescing solvent. Useful coalescing solvents include hydrocarbons, alcohols, esters, ethers and ketones. The preferred coalescing solvents include alcohols, polyols and ketones Specific coalescing solvents include monobutyl and monohexyl ethers of ethylene glycol, and phenyl ether of propylene glycol. The amount of coalescing solvent is not unduly critical and is generally between about 0 to 15 percent by weight, preferably about 0.5 to 5 percent by weight based on total weight of the resin solids.

EXAMPLES

EXAMPLE A

Backbone Resin

The following ingredients were charged into a suitable reaction vessel: 1394.8 parts Epon 828® (epoxy from Shell Chemical Company having an epoxy equivalent weight of 188); 527.2 parts Bisphenol A; 395.6 parts Tone 200® (from Union Carbide, hydroxy equivalent weight of 263.6); and 101.2 parts xylene. The charge is heated to 145° C. under a nitrogen blanket. 2.4 parts dimethyl benzyl amine was added and the mixture held at 160° C. for one hour. An additional 5.2 parts dimethyl benzyl amine was added and the mixture held at 147° C. until a 1170 epoxy equivalent weight was obtained. The mixture was cooled to 98° C. and 153.2 parts diketimine (reaction product of diethylene triamine and methyl isobutyl ketone; at 72.7% non-volatile) and 118.2 parts methylethanol amine were added. The mixture was held at 120° C. for one hour, then 698.5 parts methyl isobutyl ketone was added. The resin had a final non-volatile of 75%.

EXAMPLE B

CROSSLINKER

A blocked polyisocyanate was prepared by charging 522.0 parts Mondur TD 80 ® (from Mobay Chemical Company) into a suitable reaction vessel. 0.15 parts dibutyltin dilaurate and 385.2 parts anhydrous methyl isobutyl ketone were added under a nitrogen blanket. 390.0 parts 2-ethyl hexanol was added to the mixture while keeping the reaction flask below 60° C. 133.8 parts trimethylolpropane was added. The mixture was held at 120° C. for one hour until essentially all free isocyanate was consumed. Then 63.0 parts butanol was added. The mixture had a 70.0% non-volatile.

EXAMPLE C

|  | Weight | Solids |
|---|---|---|
| Quarternizing Agent | | |
| 2-Ethyl Hexanol Half-Capped TDI in MIBK | 320.0 | 304.0 |
| Dimethyl Ethanolamine | 87.2 | 87.2 |
| Aqueous Lactic Acid Solution | 117.6 | 88.2 |
| 2-Butoxy ethanol | 39.2 | — |
| Total | 564.0 | 479.4 |
| Pigment Grinding Vehile | | |
| Epon 829 ® | 710.0 | 682.0 |
| Bisphenol A | 289.6 | 289.6 |
| 2-Ethyl Hexanol Half-Capped TDI in MIBK | 406.0 | 386.1 |
| Quaternizing Agent (from above) | 496.3 | 421.9 |
| Deionized Water | 71.2 | 0 |
| 2-Butoxyethanol | 1095.2 | 0 |
| Total | 3068.3 | 1779.6 |

The quaternizing agent was prepared by adding dimethyl ethanol amine to the 2-ethylhexanol half-capped toluene diisocyanate (TDI) in a suitable reaction vessel at room temperature. The mixture exothermed, and was stirred for one hour at 80° C. Lactic acid was then charged followed by the addition of 2-butoxy ethanol. The reaction mixture was stirred for about one hour at 65° C. to form the desired quaternizing agent.

To form the pigment grinding vehicle, Epon 829 ® (a diglycidyl ether of Bisphenol A from Shell Chemical Company), and Bisphenol A were charged under a nitrogen atmosphere to a suitable reaction vessel and heated to 150° C. -160° C. to initiate the exothermic reaction. The reaction mixture was permitted to exotherm for one hour at 150° C. -160° C. The reaction mixture was then cooled to 120° C., and the 2-ethyl hexanol half-capped toluene diisocyanate was added. The temperature of the reaction mixture was held at 110° C. -120° C. for one hour, followed by the addition of 2-butoxy ethanol. The reaction mixture was then cooled to 85° C., homogenized, and charged with water, followed by the addition of the quaternizing agent prepared above. The temperature of the reaction mixture was held at 80° C. -85° C., until an acid value of one was obtained. The reaction mixture has a solids content of 58%.

EXAMPLE D

| Emulsion | | |
|---|---|---|
|  | Weight | Solids |
| Backbone Resin (from Example A) | 553.19 | 414.88 |
| Crosslinker (from Example B) | 319.15 | 223.41 |
| Hexylcellosolve ® | 38.30 | — |
| Surfactant* | 6.38 | — |
| Acetic acid | 11.52 | — |
| Deionized Water | 871.46 | — |
| Total | 1800.00 | 638.29 |

*Surfactant is a mixture of 120 parts Amine C ® from Ciba Geigy, 120 parts acetylenic alcohol, commercially available as Surfynol 104 ® from Air Products and Chemicals, Inc., 120 parts of 2-butoxy ethanol, 221 parts by weight of deionized water, and 19 parts glacial acetic acid.

Thoroughly mix the backbone resin from Example A, crosslinker from Example B, hexylcellosolve ®, acetic acid, and surfactant. Then the deionized water was added under agitation. This mixture was allowed to mix until a majority of the organic ketone had evaporated. The emulsion nonvolatile was adjusted to 35.5% with the necessary amount of deionized water.

EXAMPLE E

| Pigment Paste | | |
|---|---|---|
|  | Weight | Solids |
| Dispersion Resin (from Example C) | 266.4 | 154.5 |
| Deionized Water | 454.6 | — |
| Titanium Dioxide | 271.9 | 271.9 |
| Aluminum Silicate | 53.6 | 53.6 |
| Lead Silicate | 24.7 | 24.7 |
| Carbon Black | 24.7 | 24.7 |
| Lead Cyanamide | 20.6 | 20.6 |
| Dibutyltin Oxide | 16.5 | 16.5 |
| Total | 1133.0 | 566.5 |

The above ingredients were mixed until homogeneous in a suitable mixing container. They were then dispersed in a sand mill until a Hegman reading of seven or greater was obtained. The non-volatile of this material was 50.0%.

EXAMPLE F

| Pigment Paste | | |
|---|---|---|
|  | Weight | Solids |
| Dispersion Resin (from Example C) | 266.4 | 154.5 |
| Deionized Water | 454.6 | — |
| Titanium Dioxide | 272.0 | 272.0 |
| Aluminum Silicate | 74.1 | 74.1 |
| Lead Silicate | 24.7 | 24.7 |
| Carbon Black | 24.7 | 24.7 |
| Dibutyl Tin Oxide | 16.5 | 16.5 |
| Total | 1133.0 | 566.5 |

The above ingredients were combined in a suitable mixing vessel, and mixed at high speed until homogeneous. It was then dispersed in a sand grinder until a Hegman reading of seven or greater was obtained. The non-volatile was 50.0%.

EXAMPLE 1

| Electrocoat Bath | | |
|---|---|---|
|  | Weight | Solids |
| Emulsion (from Example D) | 851.0 | 302.0 |
| Deionized Water | 1013.0 | — |

| -continued | | |
|---|---|---|
| Electrocoat Bath | | |
| | Weight | Solids |
| Pigment Paste (from Example E) | 236.0 | 118.0 |
| Total | 2100.0 | 420.0 |

An electrocoat bath was prepared by blending the above ingredients. The final bath non-volatile was 20.0%. The bath conductivity was 1930 microsiemens and pH was 6.27. Two zinc phosphate treated, cold-rolled steel panels were cathodically electrocoated in an 83° F. bath, 225 volts for two minutes. The panels were cured for 17 minutes (one at 360° F. and the other at 330° F.). The film builds were 0.67 and 0.66 mils, respectively. The films exhibited exceptional smoothness at both bakes. The 360° F. and 330° F. panel cured for 17 minutes exhibited good resistance to methyl ethyl ketone solvent. In addition a 320° F. panel cured for 17 minutes exhibited acceptable resistance to methyl ethyl ketone.

EXAMPLE 2

| Electrocoat Bath | | |
|---|---|---|
| | Weight | Solids |
| Emulsion (from Example D) | 851.0 | 302.0 |
| Deionized Water | 1013.0 | — |
| Pigment Paste (from Example F) | 236.0 | 118.0 |
| Total | 2100.0 | 420.0 |

An electrocoat bath without lead cyanamide for comparison purposes was prepared by blending the above ingredients. The bath conductivity was 1750 microsiemens and pH was 5.85. Two zinc phosphate treated, cold-rolled steel panels were cathodically electrocoated in the bath at 83° F., 200 volts. One panel was cured at 360° F. for 17 minutes and the other at 330° F. for 17 minutes. The cured film builds were 0.81 and 0.83 mils, respectively. The films exhibited good smoothness at both bakes. The panel cured at 360° F. for 17 minutes exhibited good resistance to methyl ethyl ketone. The 330 F cured panel exhibited poor resistance to methyl ethyl ketone. (Panels cured at lower temperatures also exhibited poor resistance to methyl ethyl ketone).

At all curing temperatures (even down to 310° F.) the system with lead cyanamide exhibited better resistance to methyl ethyl ketone than a system without lead cyanamide.

We claim:
1. In a catalyst system useful for cathodic electrocoat processes, the catalyst system being used to catalyze a curing reaction between a blocked polyisocyanate and a polymer which is an epoxy amine adduct, wherein the improvement comprises; the catalyst system is a mixture of a primary metal catalyst and lead cyanamide.

2. The catalyst system of claim 1 wherein the primary metal catalyst is dibutyltin oxide or dibutyltin dilaurate or a mixture thereof.

3. The catalyst system of claim 2 wherein the primary metal catalyst is dibutyltin dioxide.

4. The catalyst system of claim 3 wherein the weight ratio of dibutyltin oxide to lead cyanamide is a range of from 1.0:1.0 to 3.0:1.0.

5. The catalyst system of claim 4 wherein the weight ratio of dibutyltin oxide to lead cyanamide is about 3:2.

6. The catalyst system of claim 4 wherein the lead cyanamide has been ground to a size of from 6 microns to 12 microns.

7. In a method of preparing a cathodic electrocoatable bath comprising the following steps in any workable order:
 (a) preparing an epoxy-amine adduct;
 (b) blending the epoxy amine adduct with a blocked polyisocyanate crosslinker;
 (c) acid neutralizing the epoxy-amine adduct to form an emulsion;
 (d) blending the emulsion with a pigment paste; and
 (e) adding a catalyst system to catalyze a reaction between the epoxy amine adduct and the blocked polyisocyanate crosslinker;
 wherein the improvement comprises; the catalyst system is a primary metal catalyst used in conjunction with lead cyanamide.

8. The method of claim 7 wherein the primary metal catalyst is dibutyltin oxide or dibutyltin dilaurate or a mixture thereof.

9. The catalyst system of claim 8 wherein the primary metal catalyst is dibutyltin dioxide.

10. The catalyst system of claim 9 wherein the weight ratio of dibutyltin oxide to lead cyanamide is a range of from 1.0:1.0 to 3.0:1.0.

11. The catalyst system of claim 10 wherein the weight ratio of dibutyltin oxide to lead cyanamide is about 3:2.

12. The catalyst system of claim 10 wherein the lead cyanamide has been ground to a size of from 6 microns to 12 microns.

* * * * *